(12) United States Patent
De Wergifosse

(10) Patent No.: US 8,796,871 B2
(45) Date of Patent: Aug. 5, 2014

(54) TURBINE ENGINE STARTER/GENERATOR, AND METHOD FOR THE CONTROL THEREOF

(75) Inventor: Eric De Wergifosse, Saint Augustin (FR)

(73) Assignee: Hispano-Suiza, Colombes (FR)

( * ) Notice: Subject to any disclaimer, the term of this patent is extended or adjusted under 35 U.S.C. 154(b) by 221 days.

(21) Appl. No.: 13/505,234

(22) PCT Filed: Oct. 21, 2010

(86) PCT No.: PCT/FR2010/052252
§ 371 (c)(1),
(2), (4) Date: Apr. 30, 2012

(87) PCT Pub. No.: WO2011/051598
PCT Pub. Date: May 5, 2011

(65) Prior Publication Data
US 2012/0211981 A1 Aug. 23, 2012

(30) Foreign Application Priority Data

Oct. 30, 2009 (FR) ...................................... 09 57661

(51) Int. Cl.
| | |
|---|---|
| *F02N 11/04* | (2006.01) |
| *H02P 9/04* | (2006.01) |
| *H02K 11/04* | (2006.01) |
| *H02P 1/50* | (2006.01) |
| *F02C 7/275* | (2006.01) |
| *H02K 19/14* | (2006.01) |
| *H02K 19/26* | (2006.01) |
| *H02P 9/08* | (2006.01) |
| *H02K 7/14* | (2006.01) |
| *H02K 29/03* | (2006.01) |
| *H02P 9/00* | (2006.01) |
| *F02N 11/08* | (2006.01) |

(52) U.S. Cl.
CPC ............... *H02K 11/042* (2013.01); *H02P 1/50* (2013.01); *F02C 7/275* (2013.01); *F02N 11/04* (2013.01); *H02K 19/14* (2013.01); *H02K 19/26* (2013.01); *H02P 9/08* (2013.01); *H02K 7/14* (2013.01); *H02K 29/03* (2013.01); *H02P 2009/005* (2013.01); *F02N 11/08* (2013.01)
USPC ........................................................ 290/31

(58) Field of Classification Search
CPC ......... F02C 7/275; F02N 11/04; F02N 11/08; F02N 11/0859; F02N 11/0896; H02K 19/14; H02K 19/26; H02K 7/14; H02K 29/03; H02K 11/042; H02P 1/50; H02P 9/08; H02P 2009/005; B60R 16/0235
USPC ........... 290/52, 10, 22, 31, 46, 38 R, 4 R, 4 C
See application file for complete search history.

(56) References Cited

U.S. PATENT DOCUMENTS

| | | | |
|---|---|---|---|
| 3,354,368 | A | 11/1967 | Williamson |
| 3,823,357 | A | 7/1974 | Sapper |
| 3,916,229 | A | 10/1975 | Litz et al. |
| 3,959,702 | A | 5/1976 | Godwin et al. |
| 4,139,807 | A | 2/1979 | Hucker |
| 4,830,412 | A | 5/1989 | Raad et al. |
| 5,055,700 | A | 10/1991 | Dhyanchand |
| 6,169,390 | B1 | 1/2001 | Jungreis |
| 6,844,707 | B1 * | 1/2005 | Raad ................ 322/29 |
| 6,992,403 | B1 | 1/2006 | Raad |
| 7,592,786 | B2 * | 9/2009 | Xu et al. .......... 322/59 |

FOREIGN PATENT DOCUMENTS

| | | | |
|---|---|---|---|
| FR | 2 025 926 | A2 * | 2/2009 |
| GB | 175 084 | | 2/1922 |
| GB | 594 342 | | 11/1947 |
| GB | 2 443 032 | * | 4/2008 |

OTHER PUBLICATIONS

International Search Report Issued Jun. 28, 2011 in PCT/FR10/52252 Filed Oct. 21, 2010.

* cited by examiner

*Primary Examiner* — Javaid Nasri

(74) *Attorney, Agent, or Firm* — Oblon, Spivak, McClelland, Maier & Neustadt, L.L.P.

(57) ABSTRACT

A turbine engine starter-generator including a main electrical machine including a stator and rotor with a wound rotor inducer and damper bars forming a cage, and an exciter including a stator inducer and rotor with rotor windings connected to the rotor inducer of the main electrical machine via a rotary rectifier. During a first starting stage, the electrical machine operates in asynchronous motor mode by injecting AC into its stator windings, a starting torque being generated by the damper bars, without the rotor inducer of the main electrical machine contributing significantly to generating starting torque. Then in a second starting stage, the main electrical machine operates in synchronous motor mode by injecting AC into its stator windings, while feeding its rotor inducer with DC via the exciter, the change from the first stage to the second stage taking place when rotation speed of the shaft reaches a predetermined value.

9 Claims, 5 Drawing Sheets

TURBINE ENGINE STARTER/GENERATOR, AND METHOD FOR THE CONTROL THEREOF

BACKGROUND OF THE INVENTION

The invention relates to a turbine engine starter-generators.

The field of application of the invention is more particularly that of starter-generators for gas-turbine propulsion aeroengines or for gas-turbine auxiliary power units (APU) mounted on board aircraft. Nevertheless, the invention is applicable to other types of turbine engine, for example industrial turbines.

Such a starter-generator (S/G) conventionally comprises a main electrical machine that forms a main electricity generator operating in synchronous mode after the associated turbine engine has started and ignited. The main electrical machine possesses a rotor inducer and stator windings that, in synchronous generator mode, deliver electrical energy in the form of alternating current (AC) to a network on board an aircraft via a power supply line having a line contactor mounted thereon. The AC delivered by the main generator is regulated by means of a generator regulation unit or generator control unit (GCU) that delivers direct current (DC) to a stator inducer of an exciter having its rotor windings connected to the rotor inducer of the main electrical machine via a rotary rectifier. The electrical energy needed for powering the inducer of the exciter may be delivered by an auxiliary electricity generator such as a permanent magnet synchronous generator, or it may be derived from the on-board electricity network of the aircraft.

The rotors of the main electrical machine, of the exciter, and of the auxiliary generator, if any, are mounted on a common shaft that is mechanically coupled to a shaft of the turbine engine, and they constitute a brushless starter-generator having two or three stages.

In order to start the turbine engine, it is well-known to operate the main electrical machine in synchronous electric motor mode by powering its stator windings with AC delivered on the power supply line via the line contact, and by powering the rotor inducer via the exciter. Since the shaft of the starter-generator is initially at rest, it is necessary to act via the GCU to inject AC into the stator inducer of the exciter in order to develop AC in its rotor windings that, after being rectified, serves to power the rotor inducer of the main electrical machine.

In order to be able to inject the AC needed for producing the torque required for starting, the GCU needs to be designed and dimensioned to be much greater than is necessary for powering the exciter with DC in generator mode.

In order to remedy that drawback, proposals are made in document GB 2 443 032 to modify the exciter to operate in a rotary transformer mode in order to deliver the excitation current for the rotor inducer of the main electrical machine on starting while it is operating in synchronous mode. That modification and the need to pass a high level of power via the stator of the exciter on starting at low speed mean that such a solution presents the drawback of extra cost in terms of weight and size.

Proposals have also been made to perform starting by causing the main electrical machine to operate in asynchronous motor mode rather than in synchronous motor mode. Reference may be made to documents U.S. Pat. Nos. 5,055,700, 6,844,707, and EP 2 025 926. In document U.S. Pat. No. 5,055,700, on starting, the stator windings of the main electrical machine are powered with AC via a starting contactor by means of an inverter circuit controlled with a constant ratio of voltage over frequency. The rotor of the main electrical machine is provided with damper bars that form a "squirrel cage" that enables the rotor to be set into rotation, while the rotor inducer of the main machine is periodically short-circuited by means of a special switch for avoiding damaging excess voltages. In document U.S. Pat. No. 6,844,707, on starting, stator windings of the main electrical machine are also powered with AC via a starting contactor by means of an inverter circuit that is controlled in voltage and in frequency. The rotor inducer of the main machine is short-circuited by a special switch that is initially closed. Short-circuiting the rotor inducer enables the rotor to be set into rotation in association with damper bars associated with the rotor inducer and forming a partial "squirrel cage". The short-circuit switch is opened under the control of the current from the rotor windings of the exciter when the starter-generator changes to electricity generator mode. Document EP 2 025 926 also describes a main electrical machine operating in asynchronous motor mode on starting, the starting torque being provided by putting the rotor inducer in a closed circuit in series with a resistor by means of a switch, possibly with assistance from damper bars.

Since operation in asynchronous mode is degraded compared with operation in synchronous mode, those prior art solutions are not suitable for an S/G associated with turbine engines that require high power on starting, in particular with the turbine engines of propulsion aeroengines.

Furthermore, those prior art solutions require a controllable switch to be inserted in parallel or in series with the rotor inducer of the main electrical machine, and such an element is very likely to lead to unreliability.

Furthermore, it has been known for a long time to use asynchronous mode to start synchronous electric motors that are fitted with wound inducers or with bars that form a squirrel cage. The stage of starting until the synchronous speed is reached takes place solely in asynchronous mode. Reference may be made to documents U.S. Pat. No. 3,354,368 and GB 175084.

OBJECT AND SUMMARY OF THE INVENTION

An object of the invention is to provide a turbine engine starter-generator that does not present the above-mentioned drawbacks, and to this end, in one of its aspects, the invention provides a starter-generator comprising:

a main electrical machine designed to operate in synchronous electricity generator mode after the turbine engine has started and to operate in electric motor mode during a stage of starting the turbine engine, the main electrical machine having a stator carrying stator windings and a rotor with a wound rotor inducer and damper bars forming a cage by being electrically connected to one another at their ends;

an exciter having a stator inducer and a rotor with rotor windings connected to the rotor inducer of the main electrical machine via a rotary rectifier, the rotors of the main electrical machine and of the exciter being mounted on a common shaft for coupling mechanically to a shaft of the turbine engine;

a generator regulation unit connected to the stator inducer of the exciter to supply DC to the stator inducer of the exciter while the main electrical machine is operating in electricity generator mode; and a starter regulation unit connected to the stator windings of the main electrical machine via a starting contact in order to deliver AC to the stator windings of the main electrical machine while it is operating in electric motor mode;

in which starter-generator:

the starter regulation unit includes a first regulator circuit for starting in asynchronous motor mode, a second regulator circuit for starting in synchronous motor mode, an inverter for delivering the AC to the stator windings of the main electrical machine via the starting contactor, a motor mode switch for causing the inverter to be controlled by the first or the second starting regulator circuit, and a circuit for controlling the motor mode switch to begin the starting phase in asynchronous motor mode and to change from an asynchronous motor mode to a synchronous motor mode during the starting stage when the speed of rotation of the shaft exceeds a predetermined threshold; and the cage formed by the damper bars is configured so that on its own it makes starting in asynchronous motor mode possible without the rotor inducer of the main electrical machine contributing significantly to generating the starting torque.

Such an arrangement is most particularly advantageous for starter-generators associated with turbine engines of propulsion aeroengines, with the changeover to synchronous motor mode being controlled at a speed threshold beyond which operation in asynchronous motor mode no longer guarantees that sufficient starting torque is delivered for such a turbine engine. The invention is also remarkable in that the arrangement of the damper bars is designed to enhance asynchronous motor mode operation, without requiring the rotor inducer to be configured in a short circuit on starting.

Advantageously, the damper bars are angularly distributed in substantially uniform manner, the angular pitch P between two adjacent damper bars being such that 0.8 Pm<P<1.2 Pm, preferably such that 0.9 Pm<P<1.1 Pm, where Pm is the mean value of the angular pitch of all of the damper bars. This substantially regular arrangement of the damper bars serves not only to enhance operation in asynchronous motor mode, but also to avoid significant torque ripple.

According to a feature of the starter-generator, it includes an angular position sensor connected to the second starting regulator circuit in order to provide it with information representative of the angular position of the rotor of the main electrical machine.

Also preferably, each starting regulator circuit is connected to the sensors providing information about the respective magnitudes of the currents in the stator windings of the main electrical machine, and each starting regulator circuit includes a calculation unit for evaluating the real starting torque being delivered from the information representative of the magnitudes of the currents in the stator windings, and in order to produce signals for controlling the inverter in order to servocontrol the real starting torque as delivered to a prerecorded torque setpoint value.

The starter regulator unit may be connected to a sensor providing information representative of the speed of rotation of the shaft and may include a circuit for delivering to the first and second starting regulator circuits a torque setpoint value taken from a pre-recorded profile of the variation in starting torque as a function of the speed of rotation of the shaft.

In another of its aspects, the invention also provides a turbine engine fitted with a starter-generator as defined above.

In yet another of its aspects, the invention provides a method of controlling a turbine engine starter-generator during a starting stage of the turbine engine, the starter-generator comprising: a main electrical machine having a stator carrying stator windings and a rotor with a wound rotor inducer and with damper bars forming a cage by being electrically connected to one another at their ends, and an exciter having a stator inducer and a rotor with rotor windings connected to the rotor inducer of the main electrical machine via a rotary rectifier, the rotors of the main electrical machine and of the exciter being mounted on a common shaft;

in which method:

during a first step of the starting stage, with the turbine engine initially being stationary, the main electrical machine is operated in asynchronous motor mode by injecting AC into the stator windings of the main electrical machine, a starting torque being generated by means of the damper bars practically without the rotor inducer of the electrical machine contributing to generating the starting torque;

during a following second step of the starting stage, the main electrical machine is operated in synchronous motor mode by injecting AC into the stator windings of the main electrical machine while delivering DC to the rotor inducer of the main electrical machine by injecting DC into the stator inducer of the exciter; and the change from the first step to the second step of the starting stage is performed when the speed of rotation of the rotor reaches a predetermined value.

Advantageously a main electrical machine is used in which the damper bars are angularly distributed in substantially uniform manner with an angular pitch P between two adjacent damper bars such that 0.8 Pm<P<1.2 Pm, preferably 0.9 Pm<P<1.1 Pm, where Pm is the mean angular pitch of all of the damper bars.

During the starting stage, the starter-generator is preferably controlled to servocontrol the torque delivered by the main electrical machine to a setpoint value that is predetermined as a function of the speed of rotation of the shaft.

BRIEF DESCRIPTION OF THE DRAWINGS

The invention can be better understood on reading the following description given by way of non-limiting indication and with reference to the accompanying drawings, in which.

DETAILED DESCRIPTION OF EMBODIMENTS

The invention is described below mainly in the context of its application to a turbine engine starter-generator for an engine for propelling an airplane, such as that shown in highly simplified manner by way of example in FIG. 1.

Nevertheless, the invention is applicable to starter-generators for other turbine engines, in particular helicopter turbines, industrial turbines, or the turbines of auxiliary power units (APU).

Figure 1:
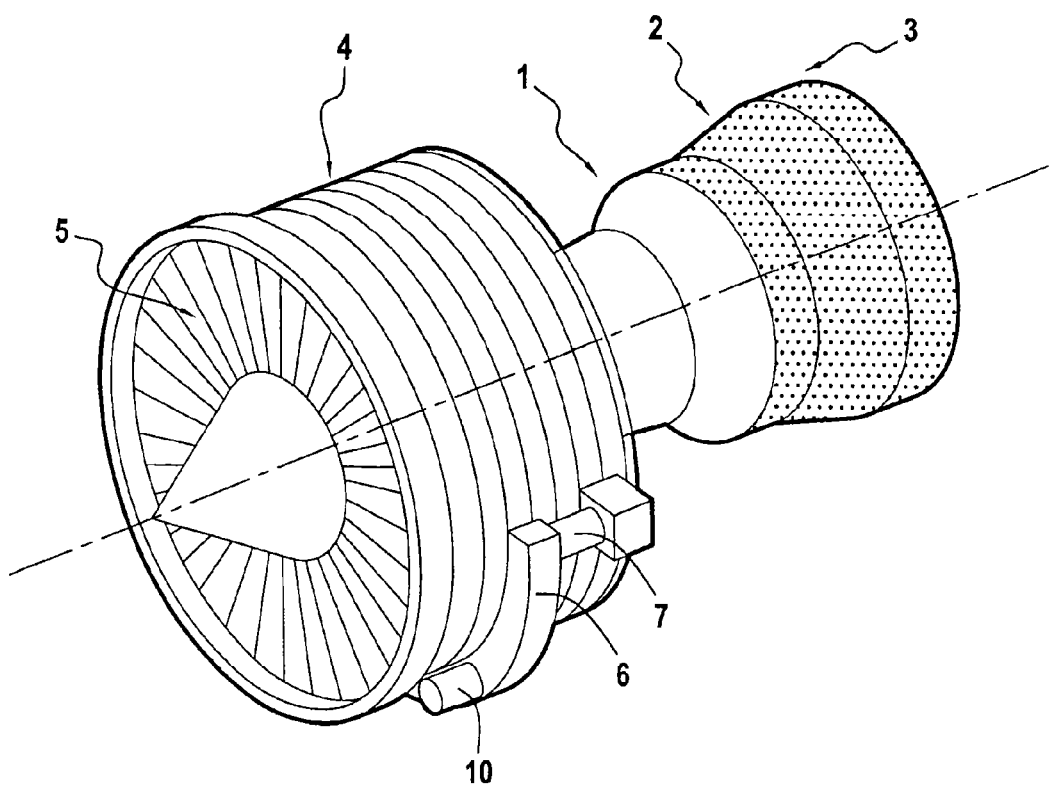
FIG. 1 is a highly simplified diagram of a gas turbine aeroengine.

The turbine engine in FIG. 1 includes a combustion chamber 1, with the combustion gas from the chamber 1 entering a high-pressure (HP) turbine 2 and a low-pressure (BP) turbine 3. The turbine 2 is coupled by a shaft to an HP compressor 4 feeding the combustion chamber 1 with air under pressure, while the turbine 3 is coupled via another shaft to an inlet fan 5 of the engine.

A transmission, or auxiliary gearbox 6, is connected via a mechanical power takeoff 7 to a turbine shaft and comprises a set of gears for driving various pieces of equipment, in particular pumps, and at least one electric starter-generator (written below "S/G") 10.

Figure 2:
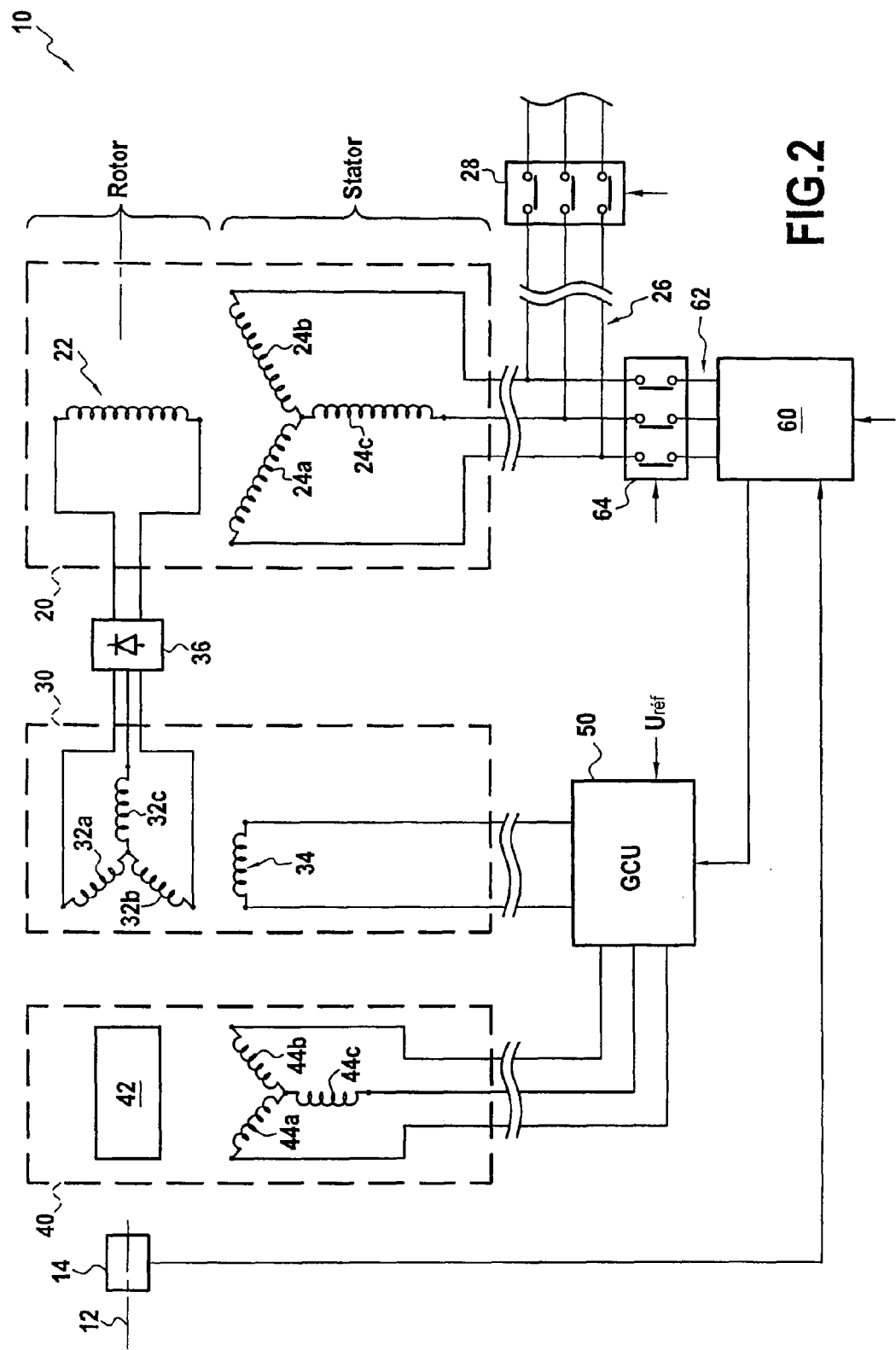
FIG. 2 is highly diagrammatic and shows the arrangement of a starter-generator in an embodiment of the invention.

FIG. 2 is a diagram of an S/G 10 having three stages, namely a main electrical machine 20, an exciter 30, and an auxiliary generator 40 having their rotors mounted on a common shaft 12 mechanically connected to a turbine shaft of an aeroengine such as that shown in FIG. 1.

The main electrical machine 20 comprises, at its rotor, a wound rotor inducer 22, and at its stator, stator windings 24a, 24b, 24c that may be star connected. The exciter 30 comprises, at its stator, and inducer winding 34, and at its rotor, rotor windings 32a, 32b, 32c that may be star connected. The AC developed at the rotor of the exciter 30 is rectified by a rotary rectifier 36, such as a rotary diode bridge, in order to power the rotor inducer of the main electrical machine. By way of example, the auxiliary generator 40 is a permanent-magnet synchronous generator with a rotor 42 carrying permanent magnets and with stator windings 44a, 44b, 44c that may be star connected.

In generator mode, with the turbine engine started and running, the main electrical machine 20 constitutes a synchronous electricity generator that delivers (in this example) a three-phase electrical voltage to the stator on a power-supply line 26 that has a line switch 28 inserted therein. The power-supply line 26 conveys the electrical voltage to the on-board network (not shown) of the airplane. The voltage produced is regulated by a generator regulation unit or generator control unit (GCU) 50 that controls the power fed to the inducer 34 of the DC exciter in order to servocontrol the voltage $U_{ref}$ at a reference point on the line 26 so that it has a setpoint value. To this end, information representative of the instantaneous value of the voltage $U_{ref}$ is delivered to the GCU 50. The electrical energy needed for feeding to the exciter 30 is delivered by the auxiliary generator 40, the CGU 50 receiving and rectifying the AC delivered to the stator of the auxiliary generator 40. In a variant, the power supply to the GCU 50 may be derived from the on-board electricity network of the airplane. Such operation of an S/G in generator mode is well-known.

In starter mode, the main electrical machine 20 constitutes an electric motor that delivers the torque needed for setting the turbine engine into rotation. During the starting stage, the stator windings 24a, 24b, 24c of the main electrical machine 20 are powered with AC by means of a starting regulation unit 60 comprising an inverter that is connected to the windings 24a, 24b, 24c by a line 62 having a starting contactor 64 inserted therein.

During a first step of the starting stage, with the turbine engine initially stationary, the electrical machine 20 operates in asynchronous motor mode making use of damper bars associated with the rotary inducer 22 of the main electrical machine 20. In well-known manner, while operating in synchronous generator mode, the damper bars serve to contribute to the mechanical behavior of the rotor, to improve the sinusoidal form factor by making the magnetic field more uniform in the airgap, to reduce the consequences of ill-balanced three-phase loads, and to damp oscillations during load transients.

According to a characteristic of the invention, the damper bars are arranged as a priority to encourage generating high starting torque.

Figure 3:
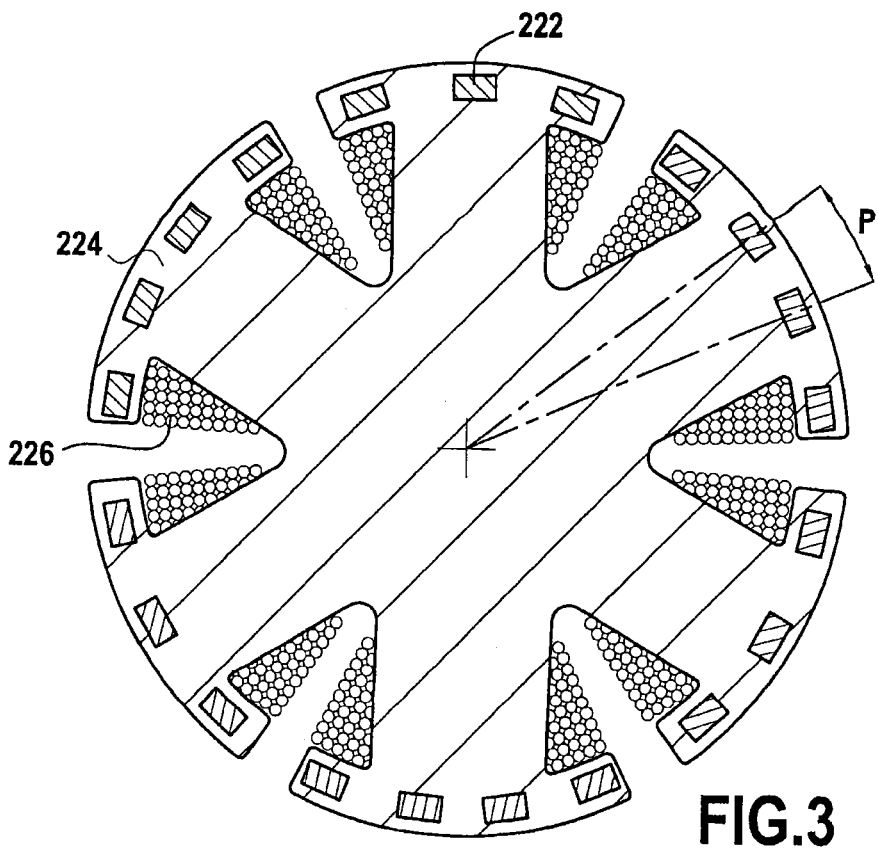
FIG. 3 is a diagrammatic radial section view of an embodiment of a main electrical machine rotor in the starter-generator of FIG. 2.
Figure 4:
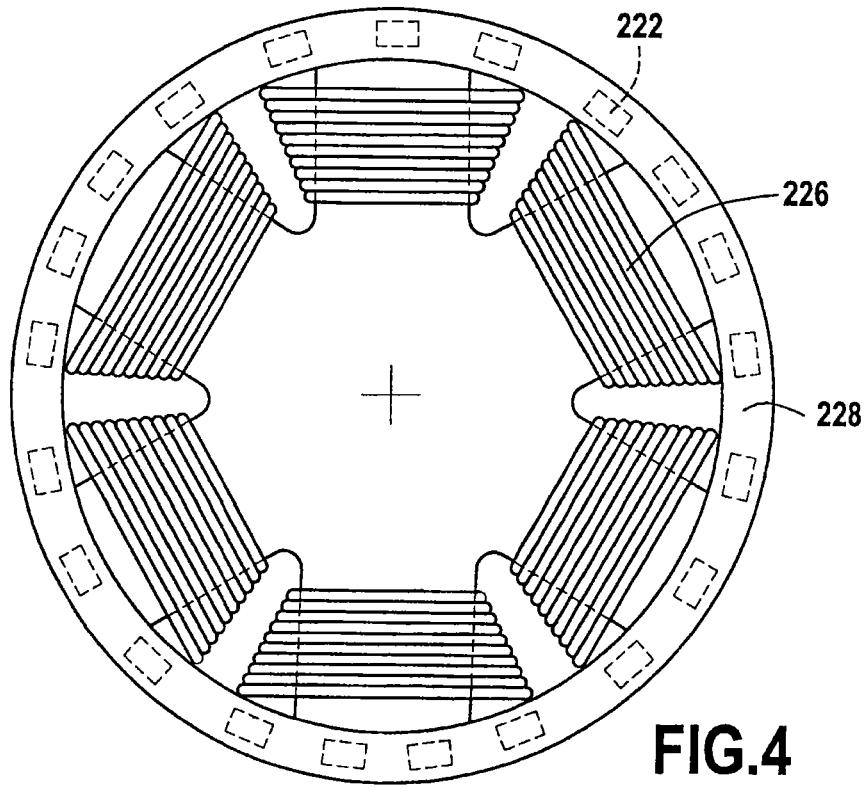
FIG. 4 is a diagrammatic end view of the FIG. 3 rotor.

As shown in FIGS. 3 and 4, the damper bars 222 are advantageously angularly distributed in substantially regular manner and they are electrically connected to one another at their ends in order to form a "squirrel cage". In the example shown, the rotor of the main electrical machine has projecting poles 224 that carry the rotor windings 226 of the inducer 22. The bars 222 extend parallel to the axis of the rotor in the vicinity of the ends of the poles 224, and the axes of the bars 222 are situated on a common cylindrical surface. At one of their axial ends, the bars 222 are united by a ring 228 (FIG. 4). At their other axial ends, the bars are united in the same manner by another, similar ring. The term "substantially regular angular distribution" for the bars 222 is used herein to mean an arrangement such that the angular pitch P between two bars satisfies the relationship 0.8 Pm<P<1.2 Pm, preferably 0.9 Pm<P<1.1 Pm, where Pm is the mean angular pitch of all of the bars.

In addition to optimizing operation for asynchronous motor mode, the substantially regular distribution of the damper bars presents the advantage of avoiding high levels of ripple in torque, of the kind that results from a distribution that is very irregular.

Nevertheless, the substantially regular arrangement of the bars requires relatively short distances between the poles 224 at their ends, where such a distance is necessarily less than the pitch P. This can result in leakage flux between poles, but the amount of leakage flux is relatively limited and not very penalizing for the operation of the main electrical machine 20 in synchronous mode. In the example shown in FIG. 3, the number of poles 224 is six, and the number of bars is equal to 21, alternating between three bars per pole and four bars per pole. It should be observed that the angular arrangement of the bars is not necessarily symmetrical about an axis passing through the center of the poles.

Figure 5:
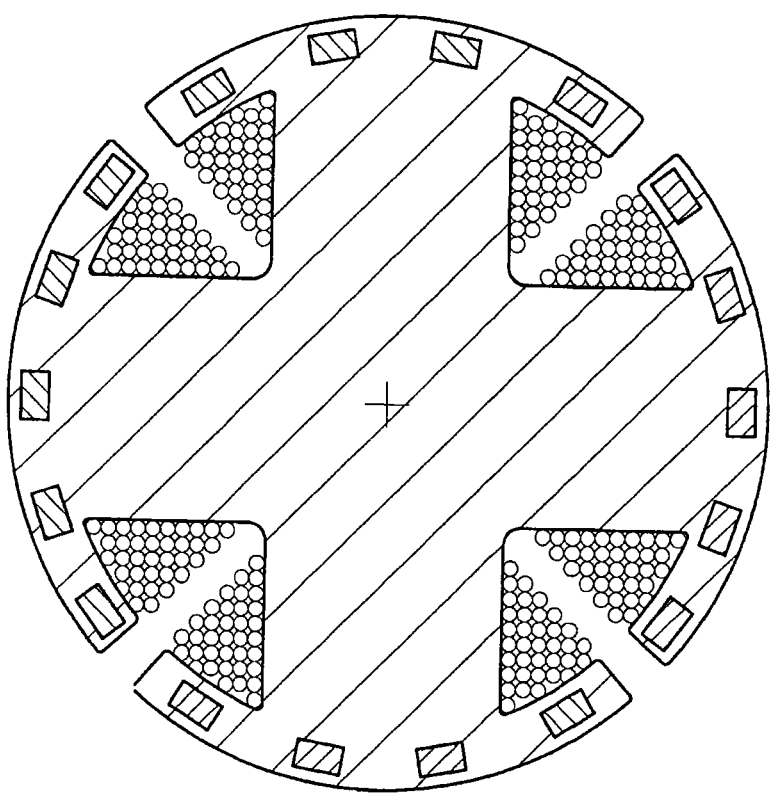
FIG. 5 is a diagrammatic radial section view of another embodiment of a main electrical machine rotor in the starter-generator of FIG. 2.

A different arrangement could be adopted, for example with a rotor having four projecting poles and a number of bars equal to 18, alternating between four bars per pole and five bars per pole, as shown in FIG. 5.

Naturally, it would be possible to adopt some number of bars other than the numbers in the examples shown, in particular depending on a particular intended application.

In order to have a high torque in asynchronous motor mode while using the cage 220, the electrical resistance of the cage should preferably be minimized. If the electrical resistance of the cage formed by the bars 222 and the rings 228 is too high, it might become impossible to induce sufficient current in the bars to reach the desired level of torque with the available level of power supply voltage from the inverter of the starting regulation unit. Furthermore, too high a resistance induces high levels of Joule effect losses, which are penalizing from the point of view of efficiency and from the point of view of heat generation. The damper bars 222 and the rings 228 connecting their ends together are then preferably made of a material that is a good conductor of electricity, e.g. copper, and they are made with a section that is greater than the section actually required just to enable the bars to perform their damping function.

It may also be advantageous for the bars 228 to have a section that is a rectangular rather than circular, for given cross-section area, in order to penalize the flux-passing magnetic section as little as possible.

It should be observed that all of the starting torque in asynchronous motor mode is produced by the cage 220, without any contribution from the rotor windings that are not themselves looped.

When the speed of rotation of the shaft 12 reaches a threshold value such that supplying the required torque can no longer be guaranteed by the main electrical machine operating in asynchronous motor mode, the machine is caused to switch from asynchronous motor mode to synchronous motor mode in order to perform the second and the last step of the starting stage. Since the exciter is rotating, DC is injected by the GCU 50 into the inducer 34 of the exciter in order to power the wound inducer 22 with DC via the rotary rectifier 36. Simultaneously, the stator windings 24a, 24b, 24c of the main electrical machine are powered with AC by means of the starting regulation unit 60 while also ensuring that the stator flux is optimally oriented relative to the position of the rotor.

In conventional manner, when the torque produced by the turbine engine is sufficient for it no longer to require the S/G, the starting contact 64 is opened, and the line contact 28 may be closed by the GCU 50 once the speed of the S/G, and thus its frequency, is sufficient.

A particular embodiment of the starting regulation unit 60 is described below with reference to FIG. 6.

The voltages fed to the stator windings of the main electrical machine are produced by a starting inverter 602 that is voltage and frequency controlled by means of an inverter control circuit 604. The electrical energy needed for generating the voltages required by the inverter 602 and for operating the various components of the starter regulation unit 60 is provided by a power supply line (not shown) from an on-board network of the airplane that is powered by an APU or by a generator unit on the ground.

Depending on the position of a motor mode switch 606, the inverter control circuit 604 has its input connected to a regulator circuit 608 for starting in asynchronous mode or to a regulator circuit 610 for starting in synchronous mode.

A circuit 614 has inputs connected to current sensors 620a, 620b, 620c that are inserted in the conductors of the line 62 in order to provide the circuits 608 and 610 with information representative of the magnitudes of the phase currents in the stator windings of the main electrical machine.

A circuit 616 has an input connected to a sensor 14 (FIG. 2) mounted on the shafts 12 of the S/G in order to provide the circuits 608 and 610 with information representative of the speed of rotation of the shaft 12. A circuit 618 also has an input connected to the sensor 14 in order to provide the circuit 610 with information representative of the angular position of the shaft 12, i.e. representative of the angular position of the rotor of the main electrical machine 20. By way of example, the sensor 14 is an angular position sensor enabling position and speed information to be derived from the signals delivered by the sensor, with such a sensor itself being well known.

The angular position sensor may be omitted when the angular position can be calculated by measuring electrical magnitudes that depend thereon.

The starting regulation unit 60 operates as follows.

In response to an order to start St, a digital control unit 600 causes the contact 64 to close and causes the motor mode switch 606 to operate to connect the starting regulator circuit in asynchronous mode 608 to the inverter control circuit 604.

Figure 6:
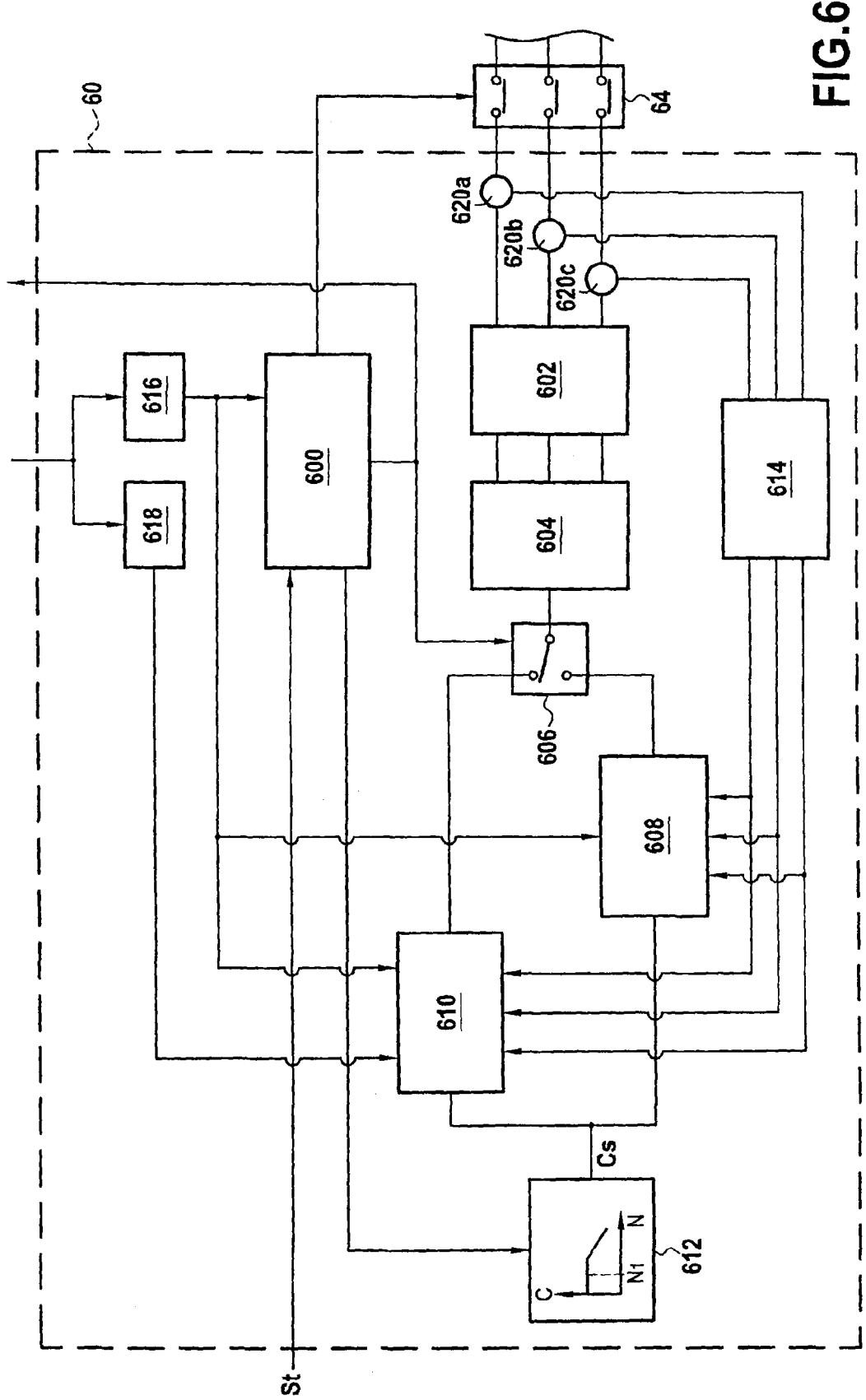
FIG. 6 is a diagram of an embodiment of a starting regulation unit of the FIG. 2 starter-generator.

As shown diagrammatically in FIG. 6, a table 612 contains information representing the value of the setpoint for the starting torque C as a function of the speed of rotation N of the shaft of the S/T. In this example, the required torque value is substantially constant from the beginning of the starting stage, and it decreases towards the end thereof. The digital control unit 600 receives information from the circuit 616 that is representative of the speed of rotation N, and it reads from the table 612 in order to provide the circuit 608 with a torque setpoint value Cs. Furthermore, the circuit 608 has a calculation unit in particular for calculating a magnitude representative of the real torque exerted by the main electrical machine and for providing the circuit for controlling the voltage and the frequency of the inverter 604 with voltage and frequency setpoint information so as to servocontrol the value of the real torque in particular to the setpoint value Cs as a function of the speed.

To this end, on the basis of the values of the phase currents in the stator windings, it is possible to calculate the torque current Iq and the flux current Id of the electrical machine, in a manner that is itself well known. The current Iq that is the image of the real torque is servocontrolled to a setpoint value corresponding to the setpoint torque Cs. The flux current Id is the image of the rotor flux and it may be servocontrolled to its maximum value before saturation.

When the speed increases, the maximum torque that can be delivered by a machine operating in asynchronous motor mode decreases as from a certain speed. There then exists a speed of rotation $N_1$ from which the machine can no longer deliver the required setpoint torque. This value $N_1$ depends on the characteristics of the machine.

When the value $N_1$ is reached, the digital control unit 600 causes the motor mode switch 606 to change over in order to connect the starting regulator circuit 610 in synchronous mode to the inverter control circuit 604, and it causes the GCU 50 to power the stator winding of the exciter 30 with DC. As above, the digital control unit 600 makes use of the table 612 to obtain the torque setpoint value Cs for the circuit 610 as a function of the speed.

Like the circuit 608, the starting regulator circuit in synchronous mode has means for calculating the real torque. The circuit 610 provides the inverter control circuit 604 with voltage and frequency setpoint information in order to servocontrol the real torque to the set point value Cs as a function of the speed, while also ensuring an optimum position for the stator flux relative to the angular position of the rotor. To this end, as above, the currents Iq and Id are calculated. The current Iq is servocontrolled to a setpoint value corresponding to the setpoint torque Cs. The flux current may be servocontrolled to a value of zero. In the exciter, the stator is fed with current such that the level of inducer flux is at a maximum in the main electrical machine, in order to reduce the stator current of the main electrical machine to as little as possible for a given level of torque to be delivered. When the speed increases, the inducer current of the exciter is diminished in order to reduce the flux in the main electrical machine so as to avoid the electro-motive force becoming too large compared with the power supply voltage of the inverter 602.

The control unit 600 causes the starting contractor 64 to open when the speed of rotation reaches a predetermined value.

The invention claimed is:

1. A turbine engine starter-generator comprising:
a main electrical machine configured to operate in synchronous electricity generator mode after the turbine engine has started and to operate in electric motor mode during a stage of starting the turbine engine, the main electrical machine having a stator carrying stator windings and a rotor with a wound rotor inductor and damper bars forming a cage by being electrically connected to one another at their ends;
an exciter including a stator inductor and a rotor with rotor windings connected to the rotor inductor of the main electrical machine via a rotary rectifier, the rotors of the main electrical machine and of the exciter being mounted on a common shaft for coupling mechanically to a shaft of the turbine engine;

a generator regulation unit connected to the stator inductor of the exciter to supply DC to the stator inductor of the exciter while the main electrical machine is operating in synchronous electricity generator mode; and a starter regulation unit connected to the stator windings of the main electrical machine via a starting contact in order to deliver AC to the stator windings of the main electrical machine while it is operating in electric motor mode;

the starter regulation unit including a first regulator circuit for starting in asynchronous motor mode, a second regulator circuit for starting in synchronous motor mode, an inverter for delivering the AC to the stator windings of the main electrical machine via the starting contactor, a motor mode switch for causing the inverter to be controlled by the first or the second starting regulator circuit, and a control circuit for controlling the motor mode switch and the starting contactor, the control circuit receiving information representative of the speed of rotation of the shaft and configured to:

close the starting contactor in response to an order to start;

begin starting of the turbine engine with the main electrical machine operating in asynchronous mode by the regulator circuit for starting in asynchronous motor mode;

continue starting with the main electrical machine operating in synchronous motor mode by the regulator circuit for starting in synchronous mode, the change from asynchronous motor mode to synchronous motor mode being made when the speed of rotation of the shaft exceeds a predetermined threshold; and after the turbine engine has started and ignited, opening the starting contactor so as to enable the electrical machine to operate in synchronous generator mode; and the cage formed by the damper bars configured to make starting in asynchronous motor mode possible without the rotor inductor of the main electrical machine contributing to generating the starting torque by being short-circuited.

2. A starter-generator according to claim 1, wherein the damper bars are angularly distributed in substantially uniform manner, the angular pitch P between two adjacent damper bars being such that 0.8 Pm<P<1.2 Pm, where Pm is the mean value of the angular pitch of all of the damper bars.

3. A starter-generator according to claim 1, further comprising an angular position sensor connected to the second starting regulator circuit to provide it with information representative of the angular position of the rotor of the main electrical machine.

4. A starter-generator according to claim 1, wherein each starting regulator circuit is connected to sensors providing information about respective magnitudes of currents in the stator windings of the main electrical machine, and each starting regulator circuit includes a calculation unit for evaluating real starting torque being delivered from the information representative of the magnitudes of the currents in the stator windings, and for generating signals for controlling the inverter to servo-control the real starting torque as delivered to a pre-recorded torque set-point value.

5. A starter-generator according to claim 4, wherein the starter regulator unit is connected to a sensor providing information representative of speed of rotation of the shaft and includes a circuit for delivering to the first and second starting regulator circuits a torque set-point value taken from a pre-recorded profile of variation in starting torque as a function of the speed of rotation of the shaft.

6. A turbine engine fitted with a starter-generator according to claim 1.

7. A method of controlling a turbine engine starter-generator during a starting stage of the turbine engine, the starter-generator including: a main electrical machine including a stator carrying stator windings and a rotor with a wound rotor inductor and with damper bars forming a cage by being electrically connected to one another at their ends, and an exciter including a stator inductor and a rotor with rotor windings connected to the rotor inductor of the main electrical machine via a rotary rectifier, the rotors of the main electrical machine and of the exciter being mounted on a common shaft that is mechanically coupled to a shaft of the turbine engine;

the method comprising:

the turbine engine initially being stationary, the main electrical machine is operated in asynchronous motor mode by injecting AC into the stator windings of the main electrical machine, a starting torque being generated by the damper bars without the rotor inductor of the main electrical machine contributing to generating the starting torque by being short-circuited;

the main electrical machine is then operated in synchronous motor mode by injecting AC into the stator windings of the main electrical machine while delivering DC to the rotor inductor of the main electrical machine by injecting DC into the stator inductor of the exciter, the change from asynchronous motor mode to synchronous motor mode being made when the speed of rotation of the shaft reaches a predetermined value, and then once the turbine engine has started and ignited, the main electrical machine is operated in synchronous generator mode, with the injection of AC into its stator windings being interrupted.

8. A method according to claim 7, wherein a main electrical machine is used in which the damper bars are angularly distributed in substantially uniform manner with an angular pitch P between two adjacent damper bars such that 0.8 Pm<P<1.2 Pm, where Pm is the mean angular pitch of all of the damper bars.

9. A method according to claim 7, wherein, during the starting stage, the starter-generator is controlled to servo-control the torque delivered by the main electrical machine to a set-point value that is predetermined as a function of speed of rotation of the shaft.

* * * * *